No. 815,871. PATENTED MAR. 20, 1906.
D. C. SMITH.
WIRE CLAMP.
APPLICATION FILED MAR. 13, 1905.
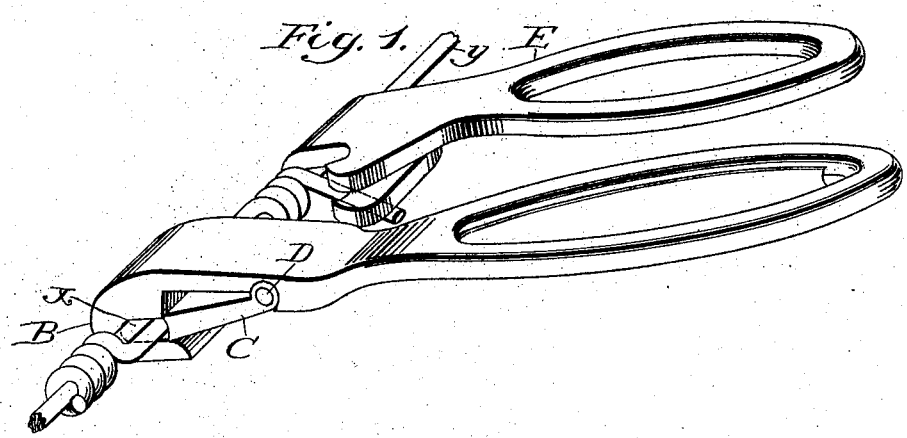
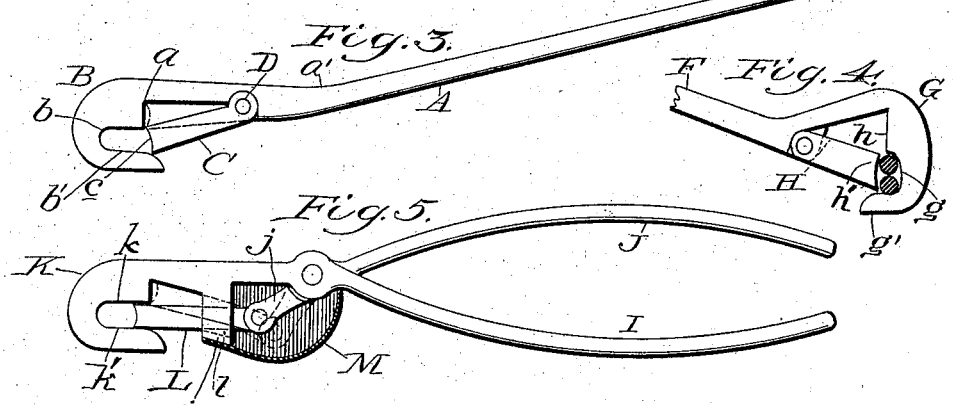
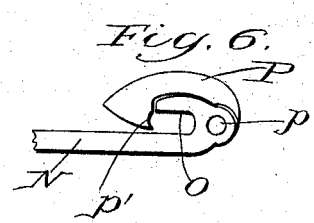
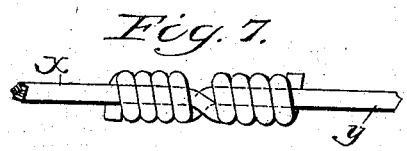
Witnesses
Inventor
Datus C. Smith
By _____ his Attorneys

UNITED STATES PATENT OFFICE.

DATUS C. SMITH, OF NEW YORK, N. Y.

WIRE-CLAMP.

No. 815,871.  Specification of Letters Patent.  Patented March 20, 1906.

Application filed March 13, 1905. Serial No. 249,792.

*To all whom it may concern:*

Be it known that I, DATUS C. SMITH, a citizen of the United States, residing at New York, in the county of New York and State of New York, have invented certain new and useful Improvements in Wire-Clamps; and I do hereby declare the following to be a full, clear, and exact description of the invention, such as will enable others skilled in the art to which it appertains to make and use the same.

This invention relates to that class of devices used in connection with wire-splicers and similar tools for clamping or holding the wires properly together during manipulation of one or more of the wires for splicing, bending, twisting, or coiling. For example, in the case of splicing two wires they are usually overlapped and held or clamped lengthwise together, for which purpose my present device is intended, while their ends are coiled or twisted one around the other by another tool, such as a splicer or coiler, not concerned in this invention.

All wire-clamps now in use, so far as I am aware, are either substantially in the form of ordinary pliers or pincers, or else they consist of double jaws pivoted at their extreme ends and adapted for folding together to grip the wires between them, suitable spaces or seats for the wires being usually formed in the jaws. Then the handles have to be locked together, usually by a locking loop or ring, in order to relieve the operator's hand from the heavy strain that would otherwise be felt in holding the handles closed together with sufficient force to effectively grip or clamp the wires between the jaws. These implements are awkward to handle, and they are expensive to make, the handles being generally made of spring-steel in order to stand the strain and hold the locking-loop during the action of splicing, bending, or twisting the wires.

My invention overcomes the objections named and provides a simple, convenient, and practicable tool which can be easily and quickly applied to the wires and will hold or clamp them properly without strain on the hand, and yet without the necessity of any locking device to relieve or avoid such strain. Hence the tool may be suitably made of malleable or even cast iron. A dominant feature of the tool is that the handle or shank has a bend or hook or a rigid jaw in the nature of a hook, in which the wires can be seated lengthwise together, and a stop or abutment for closing the entrance to the hook, jaw, or seat and preventing dislodgment of the wires therefrom. This closing may be accomplished by several kinds of stops, according to the particular construction of the device, for it may be made in several different forms or embodiments. In its preferred form my improved clamp is strictly automatic in its operation. It is simply hooked over the wires, one after another, whereupon the wires are immediately secured in place beyond the possibility of dislodgment.

With the foregoing remarks in mind the invention will hereinafter be first fully described, with reference to the accompanying drawings, which form a part of this specification, and then particularly pointed out and defined in the claims following the description.

In said drawings, Figure 1 is a perspective view of a clamp or wire-holder embodying my invention, together with a splicer or joining-tool, both applied to the operation of splicing or joining the ends of two wires, thus illustrating the conjoint use of such implements. The clamp here shown is what I consider at present the preferred form or embodiment of the invention hereinbefore mentioned. Figs. 2 and 3 are front and side views of the clamping-tool shown in Fig. 1. Figs. 4, 5, and 6 are side views of other devices embodying my invention. Fig. 7 shows the completed splice made in the operation shown in Fig. 1. The two wires are slack while being spliced, as in Fig. 1; but when the spliced wires are stretched in place the strain will naturally draw the splice together, as shown in Fig. 7.

Referring first to the tool shown in Figs. 1, 2, and 3, A denotes a handle or shank having a return-bend or hook B for holding the wires therein, usually two wires arranged lengthwise together. The hook is wide enough to provide a substantial seat for the wires—say an inch or more in breadth. It is deep enough to admit both wires one after the other, but narrow enough to confine them between the two inner faces of the members $b$ and $b'$ of the hook and prevent one wire from passing the other therein. Hence to lock the wires in their seat it is only necessary to close or stop the opening thereto by a suitable abutment. In this instance said stop or abutment is afforded by the end $c$ of a tongue C, hinged or pivoted, as at D, to the shank or holder. This tongue or stop is free to rock from the full-line position shown in Fig. 3 to the dotted-line position indicated in the same figure. The shank is cut out or rabbeted at $a$ to accommodate the tongue in the latter position when it is practically flush with the inner face of the member $b$ of the hook, leaving the entrance to the seat in the jaw or hook open. In the full-line position the rocking of the tongue is limited by the member $b'$. In use the wires are seated one upon another in the hook, or the tool is simply hooked over the wires one after another, and the tool is then held so as to allow its tongue or stop C to fall or rock over to position to close the seat. When the wires thus confined are twisted or otherwise manipulated, the pressure or strain which would otherwise unseat them is sustained by the tongue, and dislodgment is therefore impossible. Preferably the end $c$ of the tongue has a rounded groove. Without this groove in the bearing-surface of the tongue the two wires while being twisted together or coiled one around the other rolling against the edge of the tongue would sometimes lift or displace it, and thus escape; but with the groove this cannot happen. The hinge D is shown of the butt type, thus taking all strain off its pintle or knuckle, and it will be observed that the strain is entirely along the length of the shank or holder, and is consequently an immaterial factor. This handle A is shown bent back slightly at $a'$. This is a desirable feature, for it not only allows the tongue C to lie in the line of length of the handle when receiving the strain of the wires during the twisting thereof, but it also prevents the operator's hand from striking the wires when the tool is unhooked or disengaged therefrom.

This implement, which at present I consider a preferred form of my invention, is strictly automatic in its action. To hold the wires, the tool simply has to be hooked over the wires one after another, the stop or tongue C lifting or rocking into the recess $a$ to allow the passage of the wires and then falling back into locking or stopping position if the tool is properly held, thus immediately confining the wires securely in the hook beyond the possibility of dislodgment.

One size of the implement can be suitably used for several different sizes of wires, the only requisite in this respect being that the seat or jaws of the hook be narrow enough to prevent one wire passing the other.

The implement may be held with its hooked end either up or down and suitably inclined to cause the tongue to fall over into position for closing the entrance to the seat. Preferably it is held in substantially a horizontal position with the hook and tongue under, as shown in Fig. 1. This view illustrates the mode of use of the device in the operation of splicing or joining two wires $x$ and $y$, which are shown held by the tool A, while the wires are coiled or twisted one around the other by the splicer E. The splicer here shown is not concerned in the present invention.

Fig. 4 shows another embodiment of my invention in a tool similar to that of Figs. 1, 2, and 3, except that it is designed for holding two wires arranged vertically one above another in the seat or jaw instead of one horizontally beside the other therein. Therefore the handle F has a hook or jaw G formed with a shallow and approximately semi-elliptical recess or seat $g$ wide enough to receive both wires, which are confined therein by the hinged tongue H, the end of whose stop $h'$ has a slightly-rounded or parti-elliptical groove coacting with the seat $g$ to confine the wires against dislodgment. As in the former case the tongue H can lift or rock into a rabbet $h$ to admit the wires to the seat $g$ and will then fall to its stopping position if the implement is properly held, its latter movement being limited by the end or part $g'$ of the hook G. In use this implement is preferably held approximately horizontal with the hook and tongue down, thus holding the wires vertically one above the other, though they are side by side in the same seat or socket instead of arranged one upon or after another in a narrow socket.

Fig. 5 illustrates still another embodiment of the invention wherein the wires are confined in their seat by a plunger-stop operated by pivoted handles. I and J designate the pivoted handles, one of which, I, is extended beyond its pivot and has a hook K, forming a seat for a plurality of wires similar to that shown in Figs. 1, 2, and 3, while the other handle, J, has also a lever extension or arm $j$ operating the plunger-stop L. This plunger-stop works through a guide-opening $l$ in a projection $i$ on I in advance of the entrance to the seat or hook, and said opening $l$ permits rocking of the plunger-stop to the dotted-line position when the handles are opened, thus permitting the wires to enter between $i$ and K and between the members $k$ and $k'$ of K. When the handles are closed, the stop is forced down into the hook K and securely confines the wires against dislodgment. Owing to the shape of the jaw or hook K, the strain on the plunger-stop being along the length of the implement, and consequently an immaterial factor, there is practically no effort required to hold the handles closed during a splicing operation—that is, there is no strain on the workman's hand—and hence the usual locking-loop required for the handles of clamps in common use is dispensed with. M is a housing or casing for the stop.

Fig. 6 illustrates another embodiment of the invention in an implement of the same general principle as the tools shown in Figs. 1 to 4, inclusive, except that the tongue or stop is hinged to the hook or bend instead of to the shank and has a shoulder or abutment adapted to overlie and close the entrance to the hook when the implement is properly held. N denotes the shank or handle, O the return-bend or hook thereof, and P the tongue or stop, hinged at $p$ to the hook and having a shoulder $p'$ adapted to present the abutment for the wires and prevent them from dislodgment. This implement is also automatic in its action. When held approximately horizontal with its hook and tongue up, it can be simply hooked over the wires one after another and the tongue will fall down into place.

The invention is of course susceptible of embodiment in various other forms constructed and operating upon the principles herein explained.

Having thus fully described my invention, what I claim as new, and desire to secure by Letters Patent of the United States, is—

1. A wire clamp or holder comprising a shank having a return-bend or hook providing a transverse seat or socket adapted for holding a plurality of wires arranged side by side therein, and a movable stop adapted to close the seat or socket when substantially filled with the wires so as to prevent dislodgment thereof and adapted to be displaced to allow insertion or detachment of the wires.

2. A wire clamp or holder comprising a shank having a broad return-bend or hook adapted for holding substantial lengths of wires arranged approximately parallel in the hook and transversely thereof, the space in said hook being of sufficient depth to admit a plurality of wires one after another but so contracted as to prevent the wires from passing one another therein, and a back-stop or abutment for holding the wires firmly seated in the hook.

3. A wire clamp or holder comprising a shank having a transverse socket or seat adapted for holding substantial lengths of a plurality of wires arranged side by side therein, and a movable stop associated with said seat adapted to close the entrance thereto for holding the wires firmly seated and in substantial alinement therein and adapted to be displaced to allow insertion or withdrawal of the wires, the strain or pressure of the wires being exerted on the stop transversely of the direction of its movement, whereby in holding the tool the operator's hand is relieved of the strain of clamping the wires together.

4. A wire clamp or holder comprising a shank having a return-bend or hook adapted for holding substantially parallel or in alinement a plurality of wires arranged side by side in the hook and transversely thereof, and having a stop adapted to close the mouth of said hook for holding the wires against dislodgment and movable away from the mouth of the hook to allow insertion and withdrawal of the wires.

5. A wire clamp or holder comprising a handle or shank having a hook for holding wires and a pivoted tongue whose end is adapted to rock to and away from the mouth or entrance of the hook to allow seating or withdrawal of the wires and to confine them against dislodgment in the hook, the said tongue being removed from the mouth of the hook when displaced and arranged longitudinally of the hook when serving as a stop or abutment for the wires.

6. A wire clamp or holder comprising a broad shank having a transverse socket or seat of suitable depth and width to hold substantial lengths of two wires arranged together side by side, and a hinged or pivoted member having an abutment adapted to confront said socket for holding the wires therein and adapted to rock away from the mouth of said socket to permit insertion and withdrawal of the wires.

7. A wire clamp or holder comprising a handle or shank having a return-bend or hook for holding wires arranged lengthwise together, and a hinged tongue having a grooved free end adapted to close the entrance to the hook and adapted to rock away to allow the insertion or withdrawal of the wires.

8. A wire clamp or holder comprising a handle having a wide hook or bend adapted for hooking over the wires and holding them side by side therein, and an automatically-closing stop adapted to hold the wires substantially parallel and against dislodgment from the hook.

9. A wire clamp or holder comprising a shank having a bend or hook providing a seat for wires arranged transversely thereto, and a hinged or pivoted abutment opposing said seat and adapted to rock to and away from the mouth of said seat, the pivot of said abutment being approximately in line with the pressure of the wires on said abutment.

10. A wire clamp or holder comprising a shank having a bend or hook with a seat therein for wires arranged transversely thereto, and a longitudinally-disposed hinged or pivoted tongue whose free end opposes said seat and is adapted to rock to and away from the mouth thereof, said free end of the tongue constituting an abutment for confining the wires in said seat.

In testimony whereof I affix my signature in presence of two witnesses.

DATUS C. SMITH.

Witnesses:
ERNEST A. L. HENDERSON,
EDW. V. WASHBURN.